United States Patent
Schondelmaier et al.

(10) Patent No.: US 6,956,340 B2
(45) Date of Patent: Oct. 18, 2005

(54) METHOD FOR PROCESSING DATA FOR AN ELECTRONICALLY COMMUTATED MOTOR AND MOTOR FOR CARRYING OUT SAID METHOD

(75) Inventors: Hans-Dieter Schondelmaier, St. Georgen (DE); Arnold Kuner, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 107 days.

(21) Appl. No.: 10/469,081

(22) PCT Filed: Dec. 5, 2002

(86) PCT No.: PCT/EP02/13772

§ 371 (c)(1),
(2), (4) Date: Aug. 25, 2003

(87) PCT Pub. No.: WO03/052920

PCT Pub. Date: Jun. 26, 2003

(65) Prior Publication Data

US 2004/0160204 A1 Aug. 19, 2004

(30) Foreign Application Priority Data

Dec. 15, 2001 (DE) .......................... 101 61 688

(51) Int. Cl.$^7$ .............................................. H02P 3/08
(52) U.S. Cl. ..................... 318/254; 318/439; 318/138; 318/432; 318/569; 318/600
(58) Field of Search ................. 318/254, 138, 318/439, 432, 434, 569, 600, 601, 603, 459, 500, 599, 811

(56) References Cited

U.S. PATENT DOCUMENTS

| | | | | |
|---|---|---|---|---|
| 4,901,366 A | * | 2/1990 | Rottger ........................ 388/811 |
| 5,552,685 A | * | 9/1996 | Young et al. ................ 318/254 |
| 5,590,235 A | | 12/1996 | Rappenecker et al. ...... 388/803 |
| 5,675,231 A | * | 10/1997 | Becerra et al. ............. 318/801 |
| 5,712,550 A | * | 1/1998 | Boll et al. .................... 318/434 |
| 5,847,523 A | * | 12/1998 | Rappenecker et al. ...... 318/434 |
| 6,078,152 A | | 6/2000 | Dieterle et al. ............. 318/264 |
| 6,167,338 A | | 12/2000 | De Wille et al. ............. 701/51 |
| 6,249,096 B1 | | 6/2001 | Shin ........................... 318/254 |
| 6,307,338 B1 | * | 10/2001 | Kuner et al. ................. 318/254 |

FOREIGN PATENT DOCUMENTS

| | | |
|---|---|---|
| CA | 2346118 A1 | 4/2002 |
| DE | 198 45 626 | 4/2000 |
| DE | 100 24 636 | 11/2000 |
| EP | 0 986 855 | 3/2000 |
| WO | WO 97-25768 | 7/1997 |

OTHER PUBLICATIONS

U.S. Appl. No. 10/433,139, filed Jul. 2001, Berroth et al.

* cited by examiner

*Primary Examiner*—Rina Duda
(74) *Attorney, Agent, or Firm*—Milton Oliver, Esq.; Ware Fressola Van Der Sluys & Adolphson LLP

(57) ABSTRACT

The invention relates to a computer-controlled electronically commutated motor (ECM) and to an improved method for processing data therein. The computer's program executes the steps of: a) defining, in recurrent steps, the rotor position region in which a current pulse is to flow through the at least one winding phase, and the duration (TCurr) of that current pulse; b) sensing, in recurrent steps, the rotation-speed-dependent time period (TPP) required by the rotor to pass through a predetermined rotation angle range; c) monitoring the ratio between that rotation-speed-dependent time period (TPP) and the duration (Tcurr) of the current pulses; and d) as a function of the magnitude of that ratio, choosing a time to perform, in the computer, at least one predetermined calculation, either during (Flag_Fct_Within=1) the duration (TCurr) of a current pulse or in a time span outside (Flag_Fct_Within=0) a current pulse. As a result of this judicious time allocation, even an inexpensive computer can perform both commutation control and other calculation tasks without time conflicts.

14 Claims, 7 Drawing Sheets

METHOD FOR PROCESSING DATA FOR AN ELECTRONICALLY COMMUTATED MOTOR AND MOTOR FOR CARRYING OUT SAID METHOD

This application is a section 371 of PCT/EP02/13772, filed 5 Dec. 2002 and published 26 Jun. 2003 as WO 03-052920-A1, claiming priority from German application DE 101 61 688.0, filed 15 Dec. 2001. This application incorporates by reference commonly assigned U.S. Ser. No. 10/433,139, BERROTH et al., filed 29 May 2003 as the U.S. phase of PCT/EP01/15184.

FIELD OF THE INVENTION

The invention relates to a method for processing data for an electronically commutated motor, and it relates to an electronically commutated motor for carrying out such a method.

BACKGROUND

An electronically commutated motor usually has an output stage which is controlled by a driver IC (Integrated Circuit) or a computer and must be switched on and off again as exactly as possible by that driver IC or computer so that a constant rotation speed and quiet motor operation are obtained.

This is difficult to achieve in practice, since a computer such as a microprocessor or microcontroller that controls the output stage must also perform other time-critical tasks, e.g. processing a frequency signal or a PWM (Pulse Width Modulation) signal and/or controlling the motor rotation speed. These signals must also be processed very accurately in order for the motor to run quietly.

There are a number of possibilities for this. For example, the output stages can be controlled very accurately using interrupt operations; the sensing of other signals becomes more inaccurate as a result, however, because accurate sensing of other signals is blocked during an interrupt for controlling the output stage. On the other hand, those other signals could be sensed via interrupt, and the output stages could instead be controlled using a method referred to as "polling". In such a situation, if the program is currently sensing a signal, simultaneous monitoring of the output stages is not possible. The result of this is that the current in the relevant output stage is switched on or off too late, thereby causing the motor to run unevenly.

Both of the aforesaid possible solutions are therefore unsatisfactory.

A more powerful computer, capable of handling multiple time-critical functions via corresponding interrupts, could also be used. A computer of this kind would then, however, need to have a high clock frequency in order to execute the interrupt routines as quickly as possible, since even with this kind of computer these routines cannot be executed in parallel fashion. This approach would moreover be too expensive for most applications.

SUMMARY OF THE INVENTION

It is therefore an object of the invention to make available a method for processing data for an electronically commutated motor, and an electronically commutated motor for carrying out such a method.

According to the invention, this object is achieved by monitoring a ratio between a rotation-speed-dependent time period (TPP) and a current pulse duration (Tcurr) and, as a function of that ratio, selecting either a time interval during a current pulse or a time span outside a current pulse as the time to perform certain calculation operations. A better distribution of the available system time is thereby obtained with simple and inexpensive means, so that time-critical functions can be performed without disruption. Since the time-critical rotational position regions of the rotor in which interrupt operations occur, as well as the placement of the energization blocks, are known in advance, with the method according to the present invention other calculation operations can be shifted into those rotor rotation regions in which no other time-critical signals need to be processed, so that even long calculation operations can be performed with no negative influence on how the motor runs. It is thereby possible, using even a simple microcontroller, to operate an electronically commutated motor reliably and to ensure that the motor runs quietly.

Another way of achieving the stated object is to control operations of the motor with a microcontroller whose program performs the steps discussed above. Using a single simple microcontroller, such a motor can implement numerous functions, e.g. calculating a target value from a delivered signal; measuring a true value for rotation speed; controlling rotation speed; generating an alarm signal in the event of extreme rotation speed deviations; and exact commutation, which results in quiet motor operation.

Further details and advantageous embodiments of the invention are evident from the exemplary embodiment described below and depicted in the drawings, which is in no way to be understood as a limitation of the invention.

BRIEF FIGURE DESCRIPTION

Figure 9:
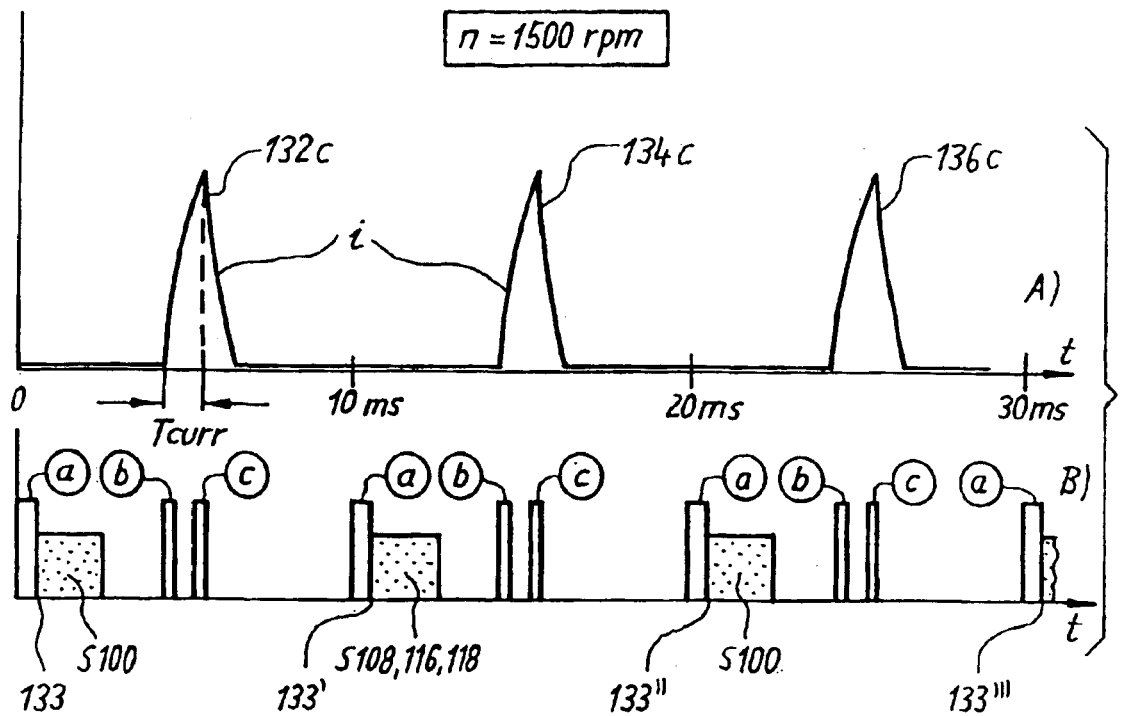
Figure 10:
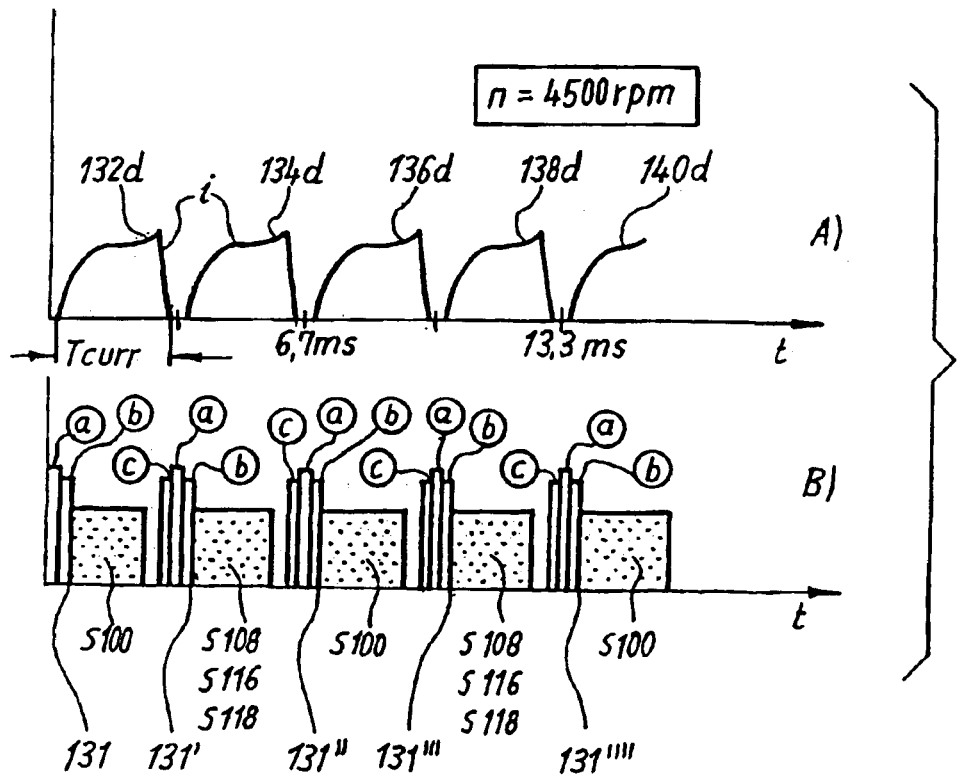

FIG. 9 schematically depicts an example of a sequence for the situation in which the current pulses are short and certain calculation operations are performed in the time prior to a current pulse; and FIG. 10 schematically depicts an example of a sequence for the situation in which the current pulses are long and certain calculation operations are performed during the duration of a current pulse.

DETAILED DESCRIPTION

In the description hereinafter, identical or identically functioning parts or functions are referred to using the same reference characters, and usually described only once, e.g. current pulses 132, 132a, 132b, 132c, and 132d.

Figure 1:
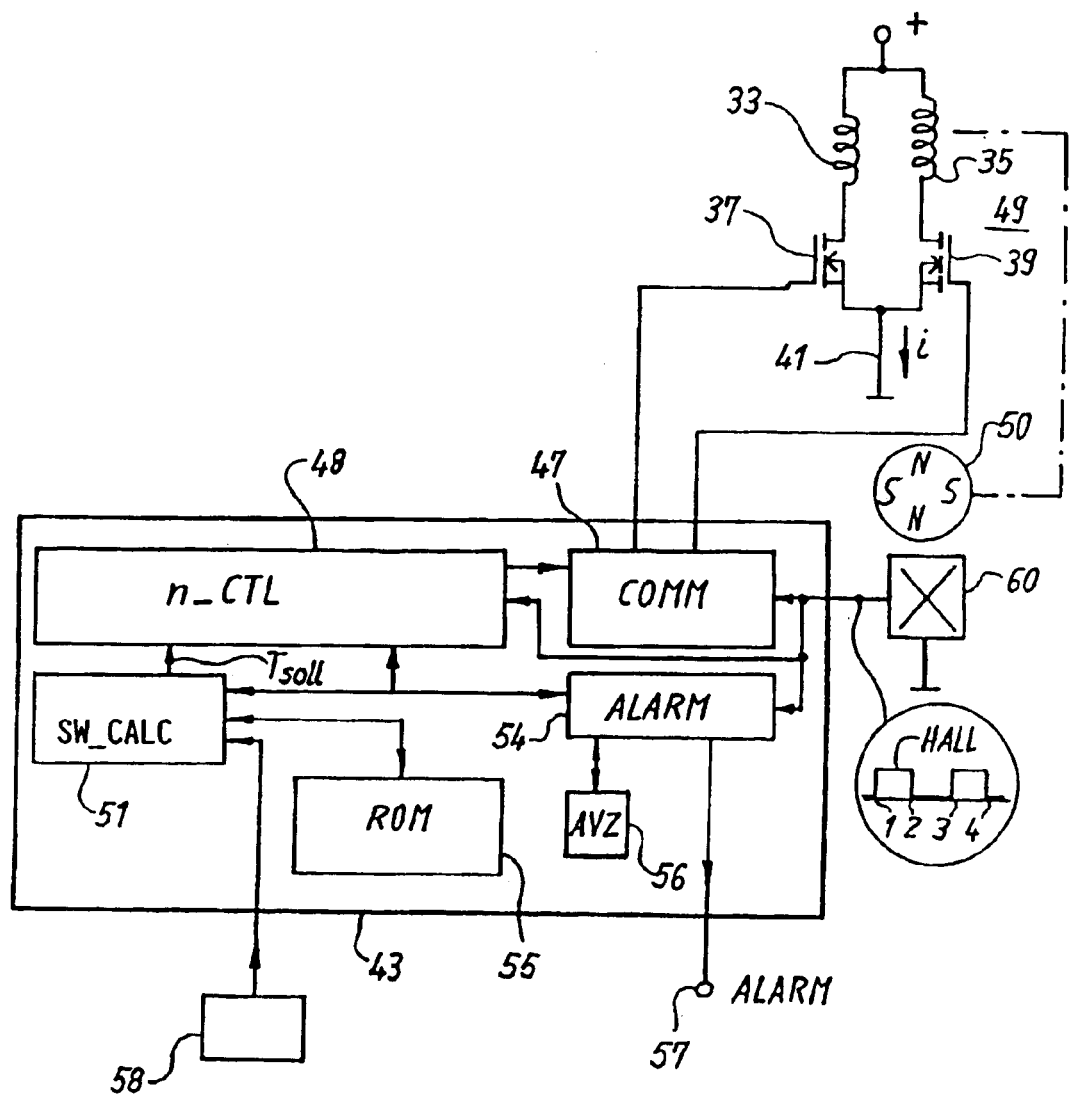
FIG. 1 is a highly schematic overview circuit diagram of an electronically commutated motor and of a computer 43 provided for controlling its commutation and rotation speed.

FIG. 1 shows an electric motor 49 having a permanent-magnet rotor 50 which in this example is depicted as a four-pole rotor, i.e. has two North poles and two South poles, all of which have a length of 90° mech.=180° el. It is said in such a case, using the terminology of electrical machine design, that the pole pitch (PP) of one pole is 180° el.; and a Hall IC 60 located opposite rotor 50 generates, as the latter rotates, a square-wave HALL signal that is depicted in FIG. 3A.

With a HALL signal of this kind it is easy, as depicted in FIG. 3A, to measure the distance PP between two adjacent edges 142, 142; and the time TPP required therefore corresponds to the time required by rotor 50, at its instantaneous rotation speed, for one quarter of a revolution.

EXAMPLE

Time TPP is assumed to be 1 ms=0.001 s. Rotor 50 then requires 4×0.001=0.004 second for one complete revolution, and its rotation speed is 1/0.004=250 revolutions per second.

Since there are 60 seconds in a minute, rotor 50 is rotating at a speed of $$(1/0.004) \times 60 = 15,000 \text{ rpm} \quad (1)$$

Since the time for one complete revolution (or indeed for part of a revolution) for an electric motor 49 having a Hall IC 60 can be measured easily and with very good accuracy, it is preferable, especially in the context of rotation speed controllers for electric motors, to work with time TPP or with a multiple N thereof (N=1, 2, 3, . . .), since this variable can be used directly after it is measured and is also required for controlling commutation of the motor. This time therefore represents, in the context of an electric motor, a more convenient indicator of rotation speed than any of the other variables such as rpm or revolutions per second; and if necessary, TPP can easily be converted into rpm by taking the reciprocal of the time T360° mech required for one revolution through 360° mech. and multiplying by 60, thus:

$$n(\text{rpm}) = 60/T360° \text{ mech} \quad (2).$$

The time T used here must be in seconds.

As FIG. 1 shows, electric motor 49 used as an example has two stator windings 33, 35. Winding 33 is connected between positive and ground 41 in series with a MOSFET 37, and winding 35 in series with a MOSFET 39. The two MOSFETs 37, 39 represent the output stages of motor 49. The total current through motor 49 is labeled i, and is depicted schematically in FIG. 3B.

Output stages 37, 39 are controlled by a computer 43, usually a microcontroller ($\mu$C), to which HALL signals from Hall IC 60 are conveyed. $\mu$C 43 contains, in the form of program modules that are indicated only schematically, a commutation control system 47 "COMM," a rotation speed controller 48 "n_CTL," a calculation member 51 "SW_CALCII" for calculating a rotation speed target value TSoll for controller 48, an alarm control system 54 for generating an ALARM signal for situations in which the rotation speed of motor 49 becomes too high or too low, a ROM 55 for storing a program, and an alarm delay counter 56 "AVZ" that coacts with alarm control system 54 which has an output 57 for the ALARM signal. The effect of AVZ 56 is that an alarm is triggered not directly, but only after an alarm condition has continuously existed, for example, for one minute.

Module 51 for target value calculation has conveyed to it from outside, e.g. from an external generator or sensor 58, a corresponding signal that is converted in SW_CALC 51 into a rotation speed target value nsoll or TSoll. This is done preferably by means of a table that can be stored in ROM 55.

This calculation of a target value requires many calculation steps and consequently a great deal of time, and is therefore preferably divided into several shorter parts. What is important is that these calculations must not interfere with the commutation of motor 49, so that it runs quietly. Even the shorter parts of the target value calculation, however, can last so long that they impair exact commutation of motor 49. The same applies to the calculation routines of rotation speed controller 48 and alarm module 54.

Motor 49 that is depicted is, of course, only one very simple example of an arbitrary electronically commutated motor; it serves merely to facilitate understanding of the invention, and in no way limits it.

Figure 2:
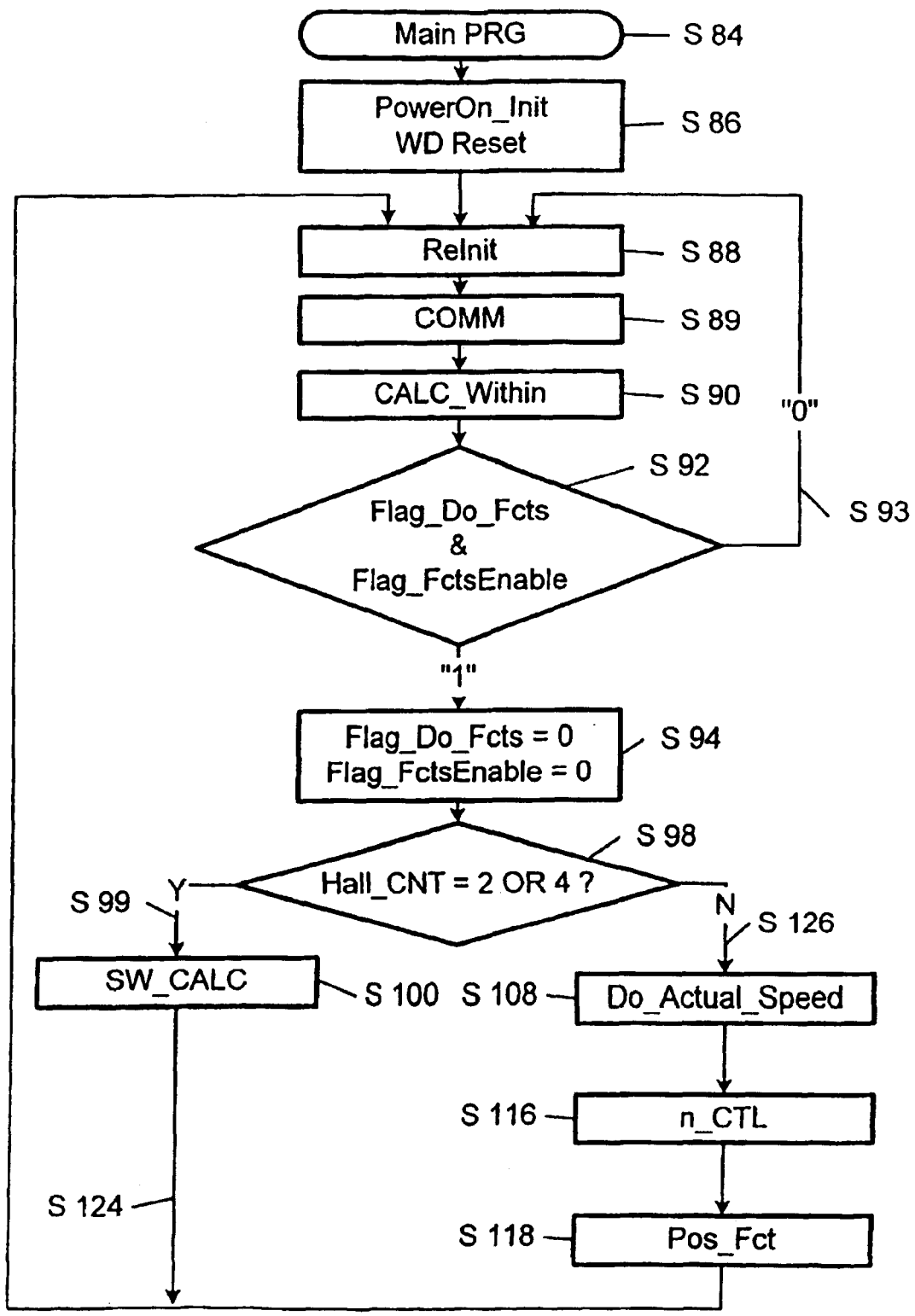
FIG. 2 is an overview flow chart depicting in schematic form the main program with the operations that occur in an electronically commutated motor of this kind during rotation of the rotor.

FIG. 2 shows the basic structure of the program sequence in $\mu$C 43 as rotor 50 rotates. This program works together with a Hall interrupt routine that is described in FIG. 7. Each edge 142 (FIG. 3) of the HALL signal causes an interrupt in which various program steps are executed and the values of two flags are determined, namely Flag_FctsEnable and Flag_Do_Fcts.

The overall program Main PRG of FIG. 2 is labeled S84. After activation it goes to step S86, where a power-on initialization PowerOn_Init takes place and watchdog WD of computer 43 is reset. The program then goes to S88, where a reinitialization of the most important values takes place at each pass. S89 then follows, in which the commutation state of motor 49 is continuously checked to determine whether one of output stages 37, 39 needs to be switched on or off. This constant checking is also referred to as "polling."

Figure 8:
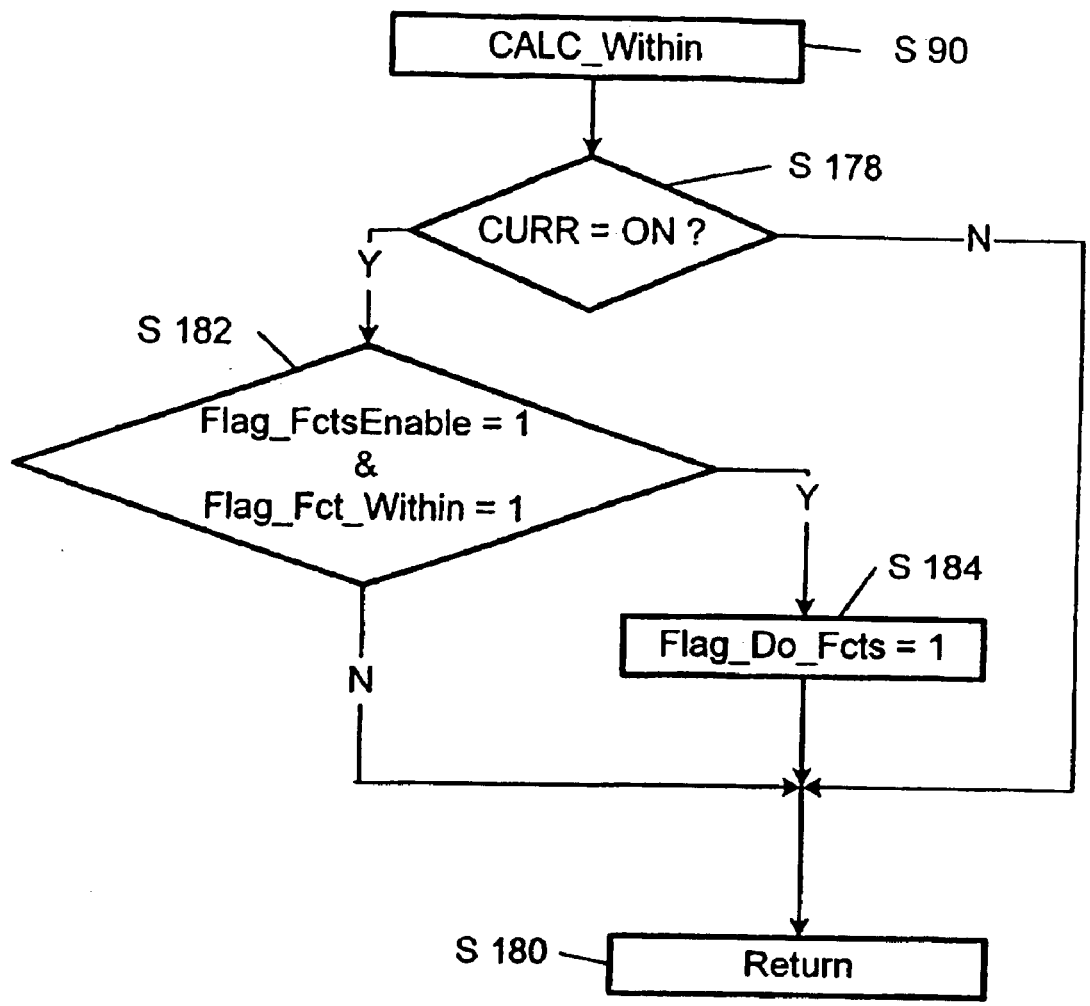
FIG. 8 shows a routine indicating which operations occur when a certain routine needs to be performed when a current is flowing in one of the phases of the motor winding.

The next step S90 contains a routine CALC_Within, which is depicted in FIG. 8 and makes certain settings after the current in one of phases 33, 35 has been switched on.

The program then goes to S92, where it determines the value of flags Flag_FctsEnable and Flag_Do_Fcts. If that value is "1," the program goes to S94, where these two flags are set to "0" so that at the next pass in step S92, the response is "0" and the program enters a short loop S93, which checks in recurrent steps, e.g. every 100 $\mu$s, whether one of output stages 37, 39 needs to be switched on or off.

S94 is followed by a step S98 in which the counter status of a Hall counter Hall_CNT is checked. If that status is even, the program goes into a left branch S99; if it is odd, it goes into a right branch S126.

In left branch S99 the program goes to S100, in which the target value determination SW_CALC is performed.

Figure 6:
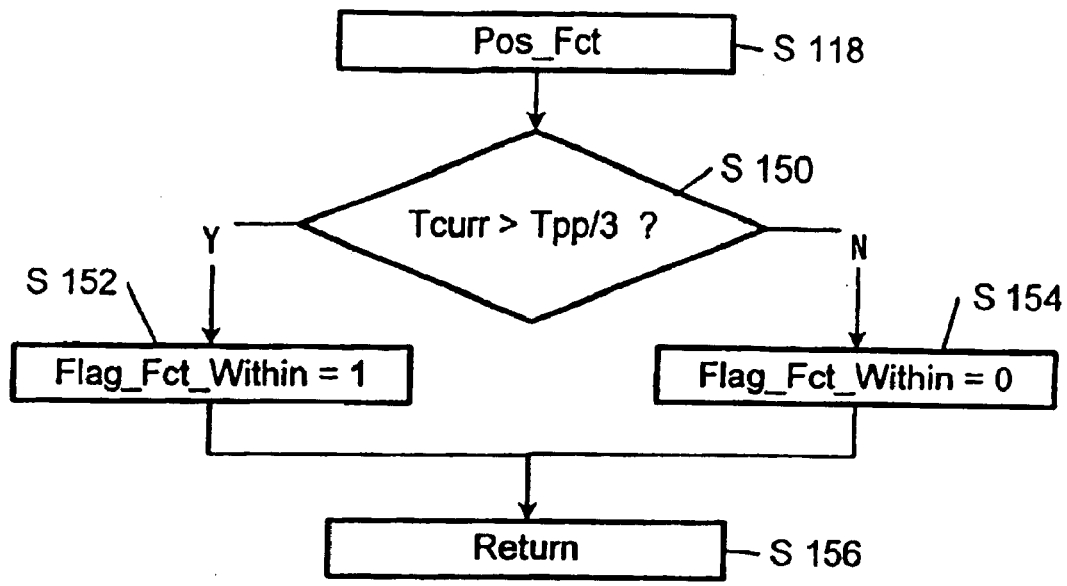
FIG. 6 shows a Pos_Fct routine, indicating how certain calculation operations are allocated to certain parts of a program sequence according to a predetermined criterion.

If the response in S98 is NO, the program goes via right branch S126 to S108 Do_Actual_Speed where the actual value determination is performed, i.e. a value characterizing the instantaneous rotation speed of rotor 50 is measured or calculated. Following S108 in S116 is a controller, e.g. rotation speed controller n_CTL depicted at 48 in FIG. 1, or a current controller; and following that in S118 is a function Pos_Fct which determines the rotor rotation region at which the calculation steps in the lower part of FIG. 2 are to be performed at the next pass. This routine is depicted in FIG. 6. The program then loops back to S88.

As rotor 50 rotates through 360° mech., the program thus runs through step S98 four times, Hall_CNT successively assuming e.g. the values 1, 2, 3, 4, as depicted in FIG. 1 for the HALL signal. As a result, either the target value for the rotation speed is calculated in S100, or the present rotation speed is sensed in S108 and then processed in controller n_CTL, and a calculation is then performed in S118 to define the rotor rotation point at which a predetermined routine is to be performed. S118 can also be followed by a routine for generating the ALARM signal.

Figure 3:
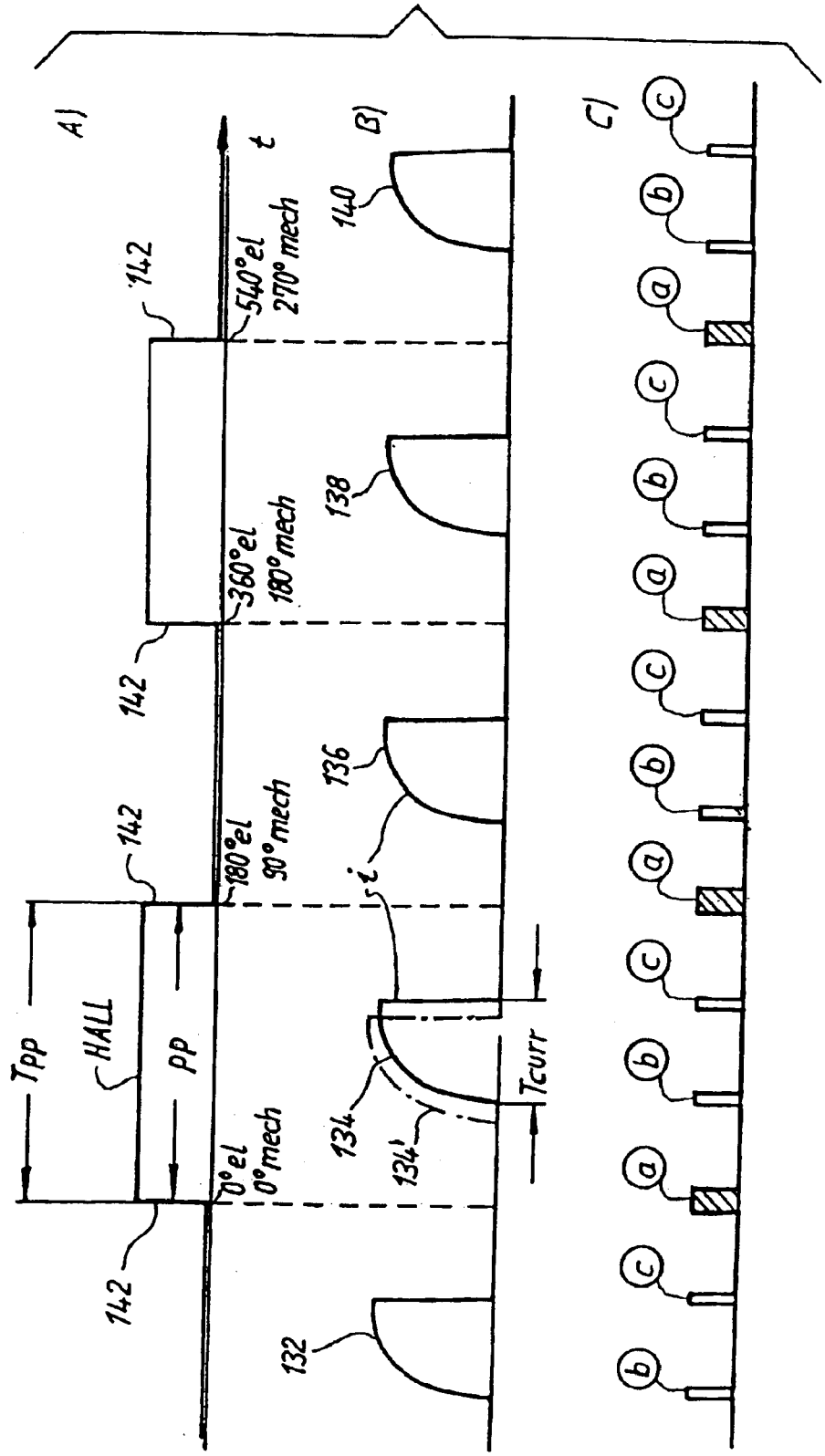
FIG. 3 is an overview depiction to explain the invention.

FIG. 3 explains the problems underlying the invention using a simple diagram. FIG. 3A depicts Hall signal HALL for the four-pole rotor 50, FIG. 3B shows the total current i at moderate load for motor 49 that is depicted, and FIG. 3C shows critical times in the life of $\mu C$ 43 that controls and regulates motor 49.

As FIGS. 3A and 3B show, it is desirable to control the current in motor 49 in such a way that its current blocks 132, 134, 136, 138, 140 extend approximately symmetrically with respect to the HALL signal, since this then results in good motor efficiency. This is called "center commutation," i.e. the current flows at the point most favorable for the motor. As rotation speed increases, current blocks 132 through 140 are preferably shifted slightly to the left; this is referred to as "commutation advance." This is symbolically depicted only for current block 134, as a shifted current block 134'.

To ensure that the electronic system of motor 49 always "knows" the rotational position of rotor 50, edges 142 of signal HALL must be sensed very accurately, i.e. by way of interrupt operations that are labeled "a" in FIG. 3C. This is the purpose of the Hall interrupt routines of FIG. 7, which ascertain very exactly the time of an edge 142. Based on the elapsed times between edges 142, the electronics can then very accurately measure or calculate the time TPP needed by rotor 50 to pass through one pole pitch PP.

Another critical aspect in FIG. 3 is the time span b in which current i is switched on in one of the two winding phases 33, 35, and also the time span c in which that current i is switched off again. The corresponding points in time are calculated in advance by the electronics, and current i must be switched on as exactly as possible at the calculated time b, and switched off as exactly as possible at the calculated time c. If the current is switched on later than time b, too little energy is then delivered to motor 49 and its rotation speed falls. If the current is switched off too late at time c, too much energy is delivered to motor 49 and its rotation speed rises. The rotation of rotor 50 thus becomes inhomogeneous, causing vibration and noise.

Time spans b and c should therefore, to the greatest extent possible, be kept unencumbered by other calculation operations, in order to allow clean and exact commutation so that motor 49 runs quietly.

Figure 4:
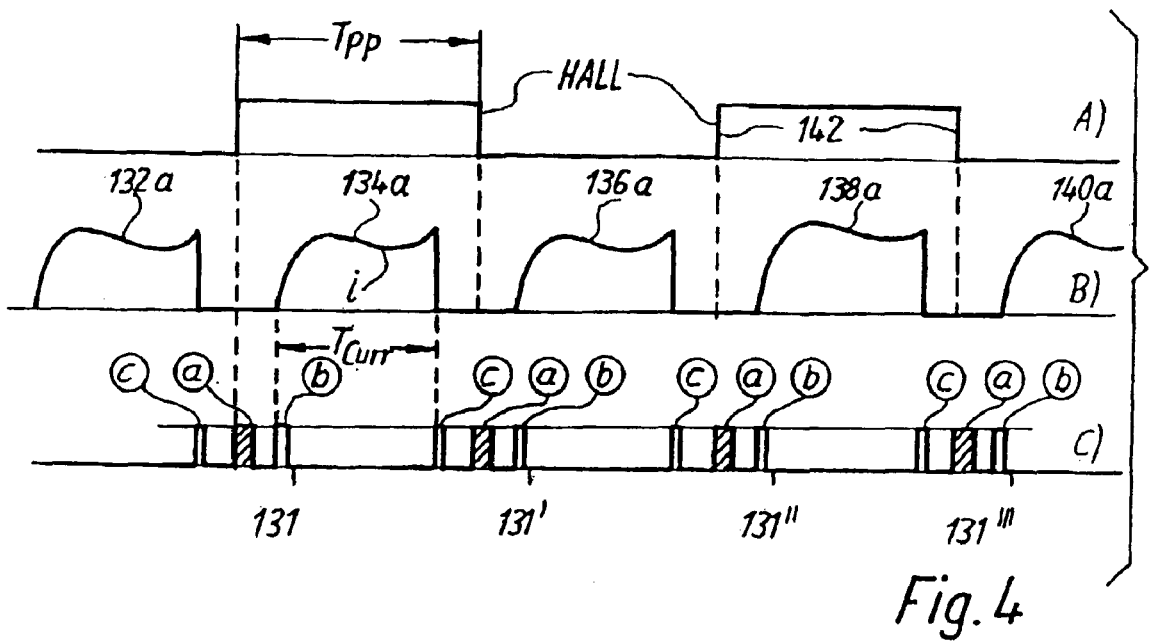
FIG. 4 is a depiction similar to FIG. 3 showing the conditions in the motor at a high motor current that occurs, for example, at high rotation speeds.

FIG. 4 is a depiction similar to FIG. 3 but with long energization blocks 132a, 134a, 136a, 138a, and 140a that are required at high rotation speeds. The consequence of these long energization blocks is that points c, a, and b are pushed close to one another, so that only very short calculations could be performed between them. With the present invention, therefore, in this case longer-duration calculations are performed between a point b and the subsequent point c, i.e. during the period in which a current block is flowing in the motor.

Figure 5:
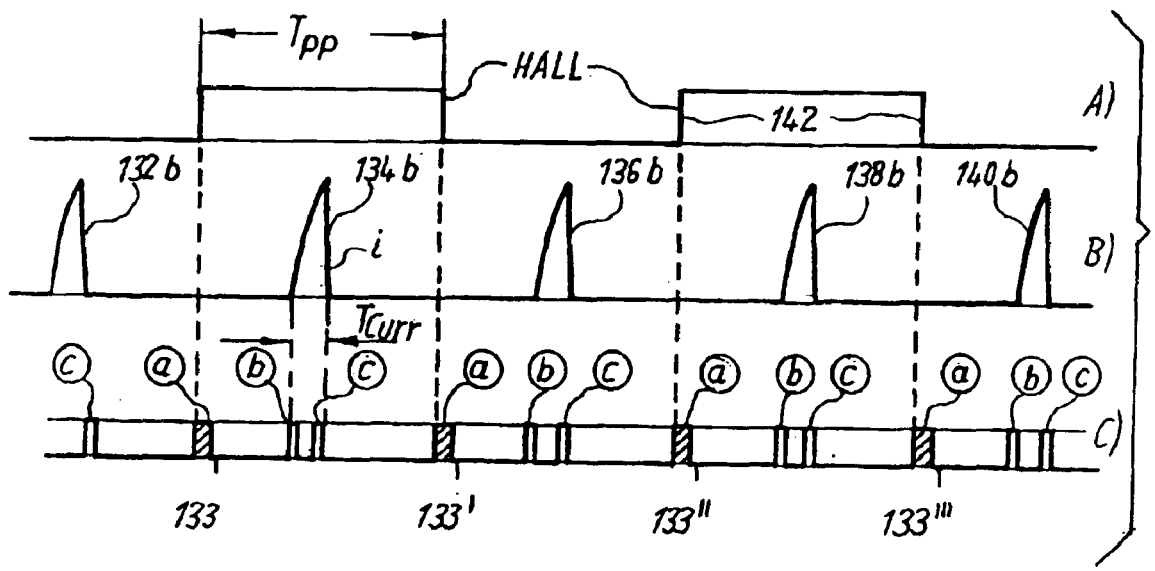
FIG. 5 is a depiction similar to FIGS. 3 and 4 showing the conditions in the motor at a low motor current that occurs at low rotation speeds.

FIG. 5 shows the opposite situation, in which energization blocks 132b, 134b, 136b, 138b, and 140b become very short because the motor is running at low speed and consequently requires little energy. The result of this is that points b and c are pushed close together. Only a very short calculation could therefore take place between these points, whereas in the time between Hall interrupt a and the subsequent switching-on b of a current block, there is sufficient time to perform even longer-duration calculations, since in the case of FIG. 5 the rotation speed is low and time TPP is therefore quite long.

FIGS. 3 through 5 show that a time interval which can be used uninterruptedly for a very long time occurs only with long energization blocks (FIG. 4). The narrower the energization blocks, the more that time is subdivided into smaller regions. The time intervals are distributed most uniformly when the energization blocks have a length TCurr corresponding to one-third of TPP, as depicted in FIG. 3. As the energization blocks become even smaller, as depicted in FIG. 5, the time interval between points b and c becomes increasingly short, but the time intervals before point b and after point c thus become correspondingly longer.

The invention therefore proceeds from the concept of performing necessary calculation procedures within the energization blocks when the blocks are long, and before (or after) the beginning of the energization blocks when the blocks are short, in order to improve the smoothness of motor 49.

This means that the situation $$TCurr=TPP/3 \qquad (3)$$

is the point at which the calculation of certain operations should be relocated from one rotor rotation region to another rotor rotation region. This relocation can be accomplished, if applicable, using a switching. hysteresis, and is described in detail below with reference to flow charts.

In FIG. 2, step S108 is followed by step S116 with rotation speed controller n_CTL which, each time the actual value is sensed again (in S108), supplies a new value (e.g. 1256 $\mu s$) for the duration TCurr of an energization block. This (variable) value is depicted by way of example in FIG. 3B. The most recent rotation speed target value TPP, which is depicted in FIG. 3A, is known on the basis of the actual value determination in S108.

Controller routine S116 in FIG. 2 is therefore followed in S118 by the Pos_Fct routine (FIG. 6), which serves to define the positions of certain-calculation routines in the program sequence so as not to disturb the commutation of motor 49.

S150 of FIG. 6 checks whether energization time TCurr (defined by controller n_CTL in S116) is longer than one-third of the rotation speed actual value TPP. If the situation as shown in FIG. 4 exists, the response is YES; in other words, longer calculation operations can be performed during the time span TCurr of an energization block. A Flag_Fct_Within is therefore set to 1 in S152.

If, on the other hand, the situation as shown in FIG. 5 exists, the response in S150 is then NO, and that same flag is therefore set to 0 in S154. The routine then goes to S156 Return.

The value of Flag_Fct_within thus defines where and when certain calculation operations are performed.

Once this matter has been clarified, it is necessary to watch for the arrival of the moment at which those calculation operations can begin at the point defined in FIG. 6. The following conditions are used for this purpose:

CONDITION 1

If the calculation is to be accomplished outside an energization block 132, 134, etc., it can be started directly after execution of the Hall interrupt. These are points 133, 133', 133", 133''' in FIG. 5.

CONDITION 2

If the calculation is to be accomplished within an energization block 132, 134, etc., it cannot begin until a) the Hall interrupt (routine "a1" in FIG. 3) AND b) the energization start operation (routine "b", in FIG. 3), are complete. These are points 131, 131', 131", 131''' in FIG. 4.

These two conditions are defined by the flags

Flag_FctsEnable and

Flag_Do_Fcts.

Figure 7:
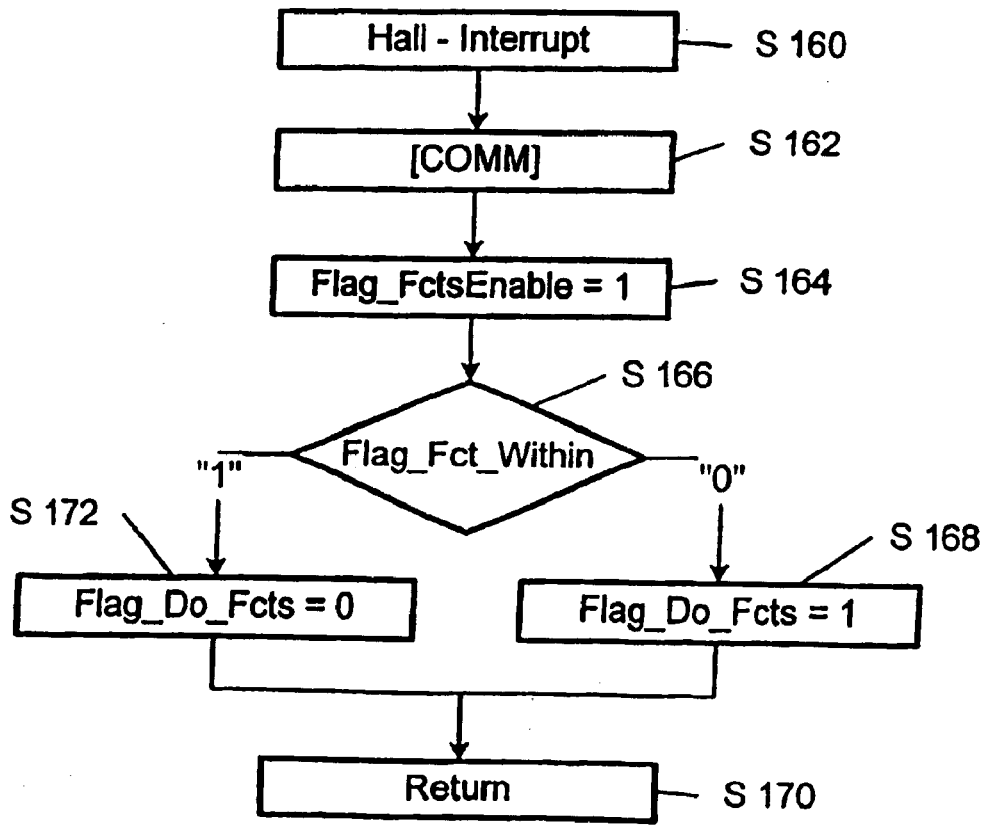
FIG. 7 shows a routine indicating the operations that occur in the context of a Hall interrupt.

Every time an edge 142 of the HALL signal occurs—which is also referred to as a "Hall change" because the Hall signal then changes either from 0 to 1 or from 1 to 0—this causes a Hall interrupt S160 that is depicted in FIG. 7.

In S162 a variety of steps are performed, e.g. steps necessary for commutation; once they are complete,

*Flag_FctsEnable=1* is set in S164 because Condition 1 (as explained above) has been met.

If the calculations can now be started, Flag_Fct_Within has a value 0 (cf. S154 in FIG. 6), and the response in S166 is therefore "0" and Flag_Do_Fcts is set in S168 to "1." The routine then goes to S170 Return. The calculation operations can thus begin at points 133, 133', etc. of FIG. 5.

Both flags are thus set, and in the main program (FIG. 2) the response in S92 is "1," so that one of the functions in the lower part of FIG. 2 is executed. The particular function executed depends on the state of Hall counter Hall_CNT, which is polled in S98.

If, however, Flag_Fct_Within has a value of "1" in S166 of FIG. 7, then

*Flag_Do_Fcts=0* is set in S172; i.e. the response in S92 of FIG. 2 is "0"; the program then enters loop S93 and repeats it at intervals of approx. 100 μs, checking whether or not the current block in the relevant phase 33 or 35 of the motor winding presently needs to be switched on. (Other calculation routines should not be performed during this monitoring operation, since otherwise the switching-on time could in some circumstances be considerably delayed.)

FIG. 8 shows the corresponding CALC_Within routine S90 for the case in which Flag_Fct_Within has a value of 1. This routine S90 is also shown schematically in FIG. 2.

Step S178 inquires whether the current in the relevant phase is presently switched on. If NO, the routine goes directly to S180 Return, and monitoring to determine whether the current should be switched on is continued.

If the response in S178 is YES, S182 then checks whether both flags

Flag_FctsEnable (S164 in FIG. 7) AND
Flag_Fct_Within (S152 in FIG. 6) have a value of 1.

If NO, the program goes to S180 Return. If YES, it goes to S184, where

*Flag_Do Fcts=1* is set, i.e. both conditions are now met in S92, and the calculation steps that are to be performed at that time in FIG. 2 below S92 can be performed; as already described, in S94 both flags of query S92 are reset to 0, so that at the next pass through S92, the program once again enters the short loop S93 in order to monitor, at closely spaced time intervals (e.g. every 100 μs), shutoff of the current in phase 33 or 35 that is presently carrying current.

In this case, therefore, the calculations below S92 (FIG. 2) cannot be performed until after points 131, 131', 131", etc. of FIG. 4, since it is only there that the conditions

*Flag_FctsEnable=1*

AND

*Flag_Do_Fcts=1* are met. In FIG. 4 these calculations are accomplished after points 131, 131', etc., i.e. during the period in which a current is flowing through phase 33 or 35.

In FIGS. 9 and 10 described below, the letters a, b, and c have the same significance as in FIG. 3.

FIG. 9 shows the conditions at a rotation speed of 1500 rpm. Here rotor 50 requires 40 ms for one revolution, i.e. it requires 10 ms=10,000 μs for each quarter-revolution or one pole pitch PP.

Assuming that controller n_CTL defines a control output TCurr of 1.35 ms (since little energy is required here), there remains before each current pulse 132c, 134c a period of approximately 4 ms in which calculations can be performed, for example the calculations in S100 of FIG. 2 before pulse 132c, and the calculations in S108, S116, and S118 before pulse 134c, as indicated in FIG. 9B. These calculations then take place after a Hall interrupt "a" and before a current pulse 132c, 134c is switched on ("b").

FIG. 10 shows the conditions at 4500 rpm, on the same time scale as FIG. 9. In this case one complete revolution of rotor 50 lasts 13.33 ms, and a quarter-revolution consequently lasts 3.33 ms.

Assuming a control output TCurr (from controller n_CTL) of 3 ms=3000 μs, what remains available for calculation operations is, for example, 2900 μs. The calculation operations in S100 of FIG. 2 can thus be performed during current pulse 132d, and the operations in steps S108, S116, and S118 during current pulse 134d, as depicted in FIG. 10B. These calculations thus take place after a current pulse 132d, 134d is switched on ("b"), and before it is switched off ("c").

The operations in the lower part of FIG. 2 may in some cases need to be distributed over several subroutines. If the SW_CALC routine is long, for example, it could be divided into two routines SW_CALC1 and SW_CALC2 which are each shorter than 2 ms, so that the various calculations do not interfere with one another. In this case, for example, SW_CALC1 would then be performed during current pulse 132d, SW_CALC2 during current pulse 134d, and steps S108, S116, and S118 during the next current pulse 136d. Many variants, adapted to the nature, length, and priority of the calculations to be performed, are thus possible. Since the target value calculation in particular often requires a great deal of calculation time, this function needs to be called more frequently than, for example, function S108, which is based on a simple time measurement.

A preferred type of commutation by means of polling is described in detail in DE 200 22 114.0 U1=PCT/EP01/15184 =WO 02-054567-A2 published 11 Jul. 2002=U.S. Ser. No. 10/433,139 filed May 29, 2003, which is therefore incorporated by reference in order to avoid excessive length. Commutation can be accomplished in a variety of ways known to those skilled in the art, commutation in accordance with DE 200 22 114.0 U1 and U.S. Ser. No. 10/433,139 being preferred.

Many variants and modifications are of course possible in the context of the present invention. A number of possibilities for further embodiments and refinements of the inventive concept can result from consideration of additional variables, for example the nature, duration, and priority of the calculations that need to be performed at a particular moment.

What is claimed is:

1. A method of processing data for an electronically commutated motor (49), which motor comprises a permanent-magnet rotor (50), an arrangement (60) for sensing the position of that rotor (50), and a stator having at least one winding phase (33, 35), which motor (49) has associated with it, in order to control commutation and perform calculation operations, a computer (43) and a program (55) to be executed by that computer (43), comprising the steps of:

a) by means of the computer (43) in conjunction with the program (55), defining, in recurrent steps, the rotor position region in which a current pulse (132, 134, 136, 138, 140) is to flow through the at least one winding phase (33, 35), and the duration (TCurr) of that current pulse;

b) sensing, in recurrent steps, a rotation-speed-dependent time period (TPP) required by the rotor (50) to pass through a predetermined rotation angle range (PP);

c) monitoring the ratio between that rotation-speed-dependent time period (TPP) and the duration (TCurr) of the current pulses;

d) as a function of the magnitude of that ratio, selecting a time to perform, in the computer (43), at least one predetermined calculation, either during the duration (TCurr) of a current pulse or in a time span outside a current pulse.

2. The method according to claim 1, further comprising performing the at least one predetermined calculation operation during the duration (TCurr) of a current pulse when that duration is long in relation to the rotation-speed-dependent time period (TPP).

3. The method according to claim 1, further comprising performing the at least one predetermined calculation operation outside the duration (TCurr) of a current pulse (132, 134, 136, 138, 140) when that duration (TCurr) is small in relation to the rotation-speed-dependent time period (TPP).

4. The method according to claim 1, further comprising using, as the rotation-speed-dependent time period (TPP), a pole pitch time period (TPP) required by a permanent-magnet rotor (50) to pass through a rotation angle corresponding to N times a pole pitch (PP) of its permanent magnet, where N is an integer of the series 1, 2, 3.

5. The method according to claim 4, further comprising performing the predetermined calculation during the duration (TCurr) of the current pulse (132, 134, 136, 138, 140) when the duration (TCurr) of a current pulse becomes longer than approximately one-third of the pole pitch time period (TPP) required for passage through a single pole pitch (PP) of the permanent-magnet rotor (50).

6. The method according to claim 4, further comprising performing the predetermined calculation outside the duration (TCurr) of the current pulse (132, 134, 136, 138, 140) when the duration (TCurr) of a current pulse becomes shorter than approximately one-third of the pole pitch time period (TPP) required for passage through a single pole pitch (PP) of the permanent-magnet rotor (50).

7. The method according to claim 6, further comprising performing the predetermined calculation operation at least predominantly before the beginning of such a current pulse (132, 134, 136, 138, 140).

8. An electronically commutated motor (49) which comprises a permanent-magnet rotor (50), an arrangement (60) for sensing the rotational position of that rotor (50), and a stator having at least one winding phase (33, 35), the motor (49) having associated with it, in order to control its commutation and perform calculation operations, a computer (43) and a program (55) to be executed by that computer (43), that program being configured to perform the steps of:

a) defining, in recurrent steps, the rotor position region in which a current pulse (132, 134, 136, 138, 140) is to flow through the at least one winding phase (33, 35), and the duration (TCurr) of that current pulse;

b) sensing, in recurrent steps, a rotation-speed-dependent time period (TPP) required by the rotor (50) to pass through a predetermined rotation angle range (PP);

c) monitoring the ratio between that rotation-speed-dependent time period (TPP) and the duration (TCurr) of the current pulses;

d) as a function of the magnitude of that ratio, selecting a time to perform, in the computer (43), at least one predetermined calculation, either during the duration (TCurr) of a current pulse or in a time span outside a current pulse.

9. The motor according to claim 8, further comprising performing the at least one predetermined calculation operation during the duration (TCurr) of a current pulse (132, 134, 136, 138, 140) when that duration is long in relation to the rotation-speed-dependent time period (TPP).

10. The motor according to claim 8, further comprising performing the at least one predetermined calculation operation outside the duration (TCurr) of a current pulse (132, 134, 136, 138, 140) when that duration (TCurr) is small in relation to the rotation-speed-dependent time period (TPP).

11. The motor according to claim 8, further comprising using, as the rotation-speed-dependent time period, a pole pitch time period (TPP) required by a permanent-magnet rotor (50) to pass through a rotation angle corresponding to N times a pole pitch (PP) of its permanent magnet, where N is an integer of the series 1, 2, 3.

12. The motor according to claim 11, further comprising performing the predetermined calculation operation outside the duration of the current pulse (132, 134, 136, 138, 140) when the duration (TCurr) of a current pulse becomes longer than approximately one-third of the pole pitch time period (TPP) required by the rotor (50) to pass through a single pole pitch (PP).

13. The motor according to claim 11, further comprising performing the predetermined calculation operation outside the duration of the current pulse (132, 134, 136, 138, 140) when the duration (TCurr) of a current pulse becomes shorter than approximately one-third of the pole pitch time period (TPP) required by the rotor (50) to pass through a single pole pitch (PP).

14. The motor according to claim 13, further comprising performing the predetermined calculation operation at least predominantly before the beginning of such a current pulse (132, 134, 136, 138, 140).

* * * * *

UNITED STATES PATENT AND TRADEMARK OFFICE
CERTIFICATE OF CORRECTION

PATENT NO. : 6,956,340 B2  Page 1 of 1
APPLICATION NO. : 10/469081
DATED : October 18, 2005
INVENTOR(S) : Hans-Dieter Schondelmaier and Arnold Kuner It is certified that error appears in the above-identified patent and that said Letters Patent is hereby corrected as shown below:

Title should be : --METHOD OF...-- not "METHOD FOR"

In column 3, line 59, "CALCII" should be --CALC--

In column 6, line 32, "." after "switching" should be deleted

In column 7, line 3, "all" should be --a--

In column 7, line 63, "Flag_Do Fcts" should be --Flag_Do_Fcts--

In column 8, line 59, "5108" should be --S108--

Signed and Sealed this

Twenty-fifth Day of December, 2007

JON W. DUDAS
*Director of the United States Patent and Trademark Office*